United States Patent [19]

McBurnett et al.

[11] Patent Number: 5,363,649

[45] Date of Patent: Nov. 15, 1994

[54] HYDRAULIC DRY VALVE CONTROL APPARATUS

[75] Inventors: James R. McBurnett, Greer; Weston R. Poyner, Greenville, both of S.C.

[73] Assignee: Dana Corporation, Toledo, Ohio

[21] Appl. No.: 452,521

[22] Filed: Dec. 18, 1989

[51] Int. Cl.⁵ ............................................. F16D 31/00
[52] U.S. Cl. ...................................... 60/325; 60/459; 417/295; 251/326
[58] Field of Search .................. 417/295, 440; 60/325, 60/459; 251/326

[56] References Cited

U.S. PATENT DOCUMENTS

| | | | |
|---|---|---|---|
| 1,980,374 | 11/1934 | Bradshaw | 417/279 |
| 3,463,193 | 8/1969 | Yost | 251/326 X |
| 3,935,917 | 2/1976 | Eley et al. | 180/53.4 |
| 3,961,862 | 6/1976 | Edstrom et al. | 417/295 X |
| 4,052,135 | 10/1977 | Shoop et al. | 417/295 |
| 4,345,881 | 8/1982 | Peterson et al. | 417/295 X |
| 4,383,546 | 5/1983 | Walters, Jr. | 137/240 |
| 4,471,942 | 9/1984 | Kocasowski | 251/326 X |
| 4,731,999 | 3/1988 | Niemiec | 417/295 |
| 4,741,675 | 5/1988 | Bowden | 417/295 |
| 4,746,276 | 5/1988 | McBurnett et al. | 417/295 |
| 4,818,189 | 4/1989 | Nakajima | 417/295 |

Primary Examiner—Edward K. Look
Assistant Examiner—Todd Mattingly
Attorney, Agent, or Firm—F. B. McDonald

[57] ABSTRACT

A hydraulic pressure system includes a pump and a dry valve situated in the inlet of the pump, the dry valve being actuated by a pilot valve capable of capturing the pressure differentials between inlet and outlet of the pump for shifting the dry valve between opened and closed positions. In the dry operational mode, the pump inlet operates at a pressure below atmospheric, thus providing a pressure differential substantial enough to move the dry valve to an opened position. In the preferred form, the pilot valve is a solenoid actuated two-position, four-way, spring loaded valve. The dry valve is a gate valve directly coupled to a fluid control motor.

9 Claims, 1 Drawing Sheet

HYDRAULIC DRY VALVE CONTROL APPARATUS

BACKGROUND OF INVENTION

This invention relates to the use of dry valves in lieu of mechanical clutches for effectively disengaging fixed displacement pumps continuously driven by driveshafts connected to engines. More particularly, the invention relates to apparatus for controlling the movement of a dry valve between open and closed positions.

Available actuators for conventional dry valves are either pneumatically or manually operated. Dry valves are typically utilized in mobile vehicles outfitted with pressurized air systems. Most often, dry valves are incorporated into packers of the type associated with refuse vehicles. A prime mover, e.g. the vehicle engine, continuously drives a hydraulic gear pump even while there is no demand on the pump. When closed, the typical dry valve virtually starves the pump inlet of hydraulic fluid, allowing only a small amount of fluid to flow through the pump for purposes of lubrication and cooling.

It would be advantageous to eliminate the need for an air source, along with the weight which results from the pneumatic equipment carried by the vehicle. Typically, pressurized air is moisture-laden and tends to corrode cylinder parts over extended periods of time. In addition, the air occasionally leaks into the hydraulic system and reduces efficiency of the system, or worse causes structural damage to the system.

Finally, there is a significant mobile market segment comprised of vehicles which do not normally have air supply equipment, but which would benefit from the use of hydraulic pumping systems which include dry valves. This invention addresses the latter market segment.

SUMMARY OF THE INVENTION

The hydraulic dry valve control apparatus of the present invention makes use of a hydraulic operating pressure differential between inlet and discharge ports of a hydraulic pump. More specifically, the existence of a vacuum at the pump inlet during the dry operating mode is sufficient to enable the dry valve to be shifted between closed and opened positions by a small hydraulic fluid motor, such as a reciprocal piston in a cylinder. Thus, an external air pressure source may be entirely eliminated for actuation of the dry valve.

In a preferred form, the control apparatus of the present invention is responsive to pump outlet pressure for moving the dry valve to a closed position, and is responsive to differential pressure between inlet and outlet pump ports for moving the dry valve to the opened position.

In a preferred form, a reversible fluid control motor is comprised of a piston actuator formed of a cylinder, a piston reciprocally moveable in the cylinder, the piston having a head and stem, wherein the stem is fixed directly to the dry valve. Also in the preferred form, the dry valve is a gate valve, designed so that only sliding friction must be overcome for shifting the dry valve between closed and opened positions.

DETAILED DESCRIPTION OF A PREFERRED EMBODIMENT

Figure 1:
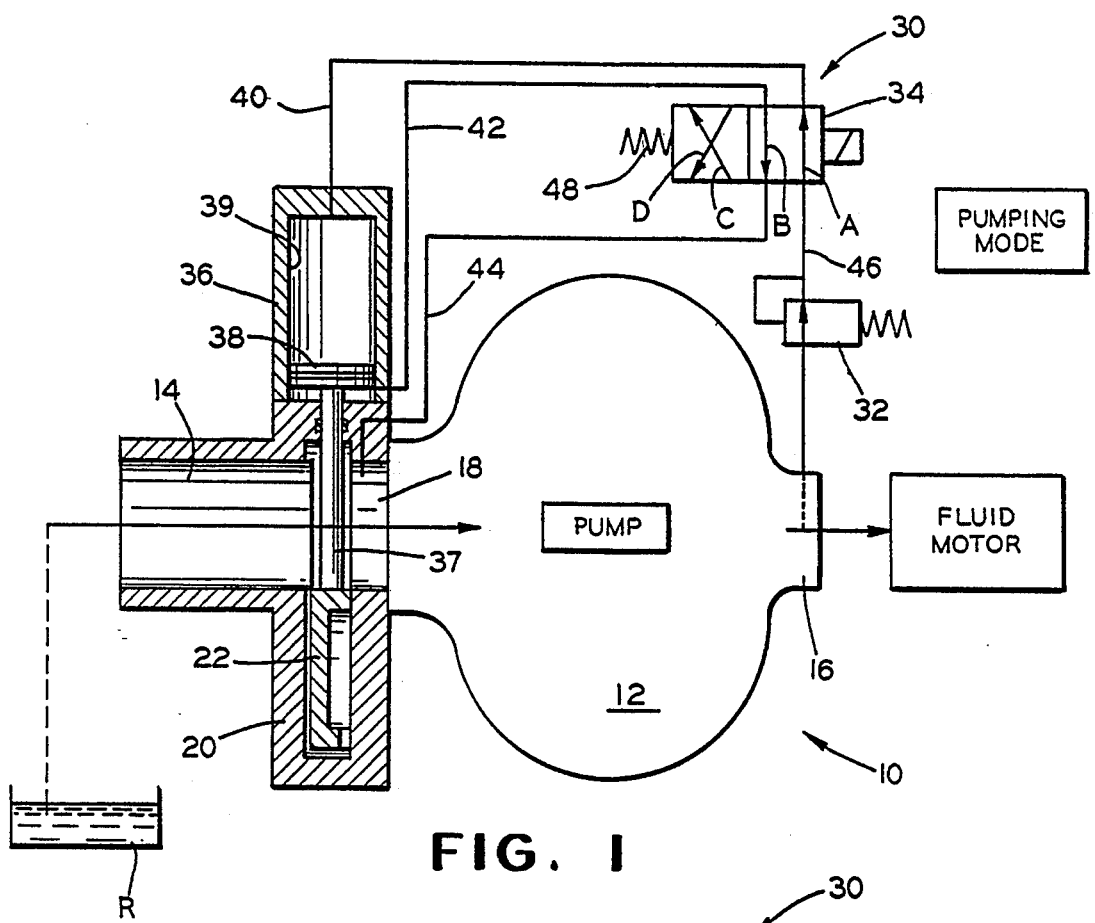
FIG. 1 is a schematic view of a hydraulic pressure system, which includes a preferred embodiment of the hydraulic valve control apparatus of the present invention, shown during the system pumping mode.

Referring initially to FIG. 1, a hydraulic pressure system 10 includes a pump 12 which has an inlet port 14 and a discharge or outlet port 16. The inlet port 14 is coupled directly to a reservoir R. Communicating with the inlet 14 is a dry valve assembly 20 which in the preferred form of the present invention is a sliding valve member, preferably a gate valve 22.

In order to operate the hydraulic dry valve assembly 20, a fluid flow control apparatus 30 is utilized. The control apparatus 30 includes an outlet pressure reducing valve 32 in the pump outlet line 46 which operates to reduce the pressure of the fluid which flows from the outlet port 16, thus permitting a small controlled stream of fluid flow to a piston actuator 36 by way of a pilot valve 34. As a fluid control motor, the piston actuator 36 is not required to handle the higher working pressures which exist at the outlet port 16. The pressure reducing valve 32 typically will drop pressure from upwards of 2500 psi down to 15 to 20 psi.

The pilot valve 34, just downstream of the pressure reducing valve 32, is a two position, four-way, spring-loaded solenoid valve in the preferred embodiment as herein described. Thus referring now also to FIG. 2, it will be seen that the valve 34 has a first position which corresponds to the active pumping mode, wherein flow paths A and B through the valve are utilized for directing a flow of control fluid through the pump outlet line 46, directly into a flow line 40, and into one end of the piston actuator as shown. The effect of the 15 to 20 psi flow of fluid entering into the piston actuator 36 through flow line 40 is to push the piston 38 downwardly within cylinder 39. The piston 38 incorporates a stem 37 directly coupled to the gate valve 22 of the dry valve assembly 20. When the piston 38 is in the down position as shown in FIG. 1, the gate is fully opened to permit unrestricted flow into the pump. In this mode, the discharge pressure at the outlet port 16, even after reduction of the valve 32 will always be sufficient to hold the piston 38 down against the bottom of the cylinder, and thereby to hold the gate in its fully opened position.

Those skilled in the art will appreciate that upon transition to the pumping mode, the actuator flow line 42 will permit fluid to escape from the bottom of the cylinder 39 and to pass through flow path B of the pilot valve 34, through the pump inlet line 44 and into the pump inlet 14 at a point 18 downstream of the gate valve as shown.

Figure 2:
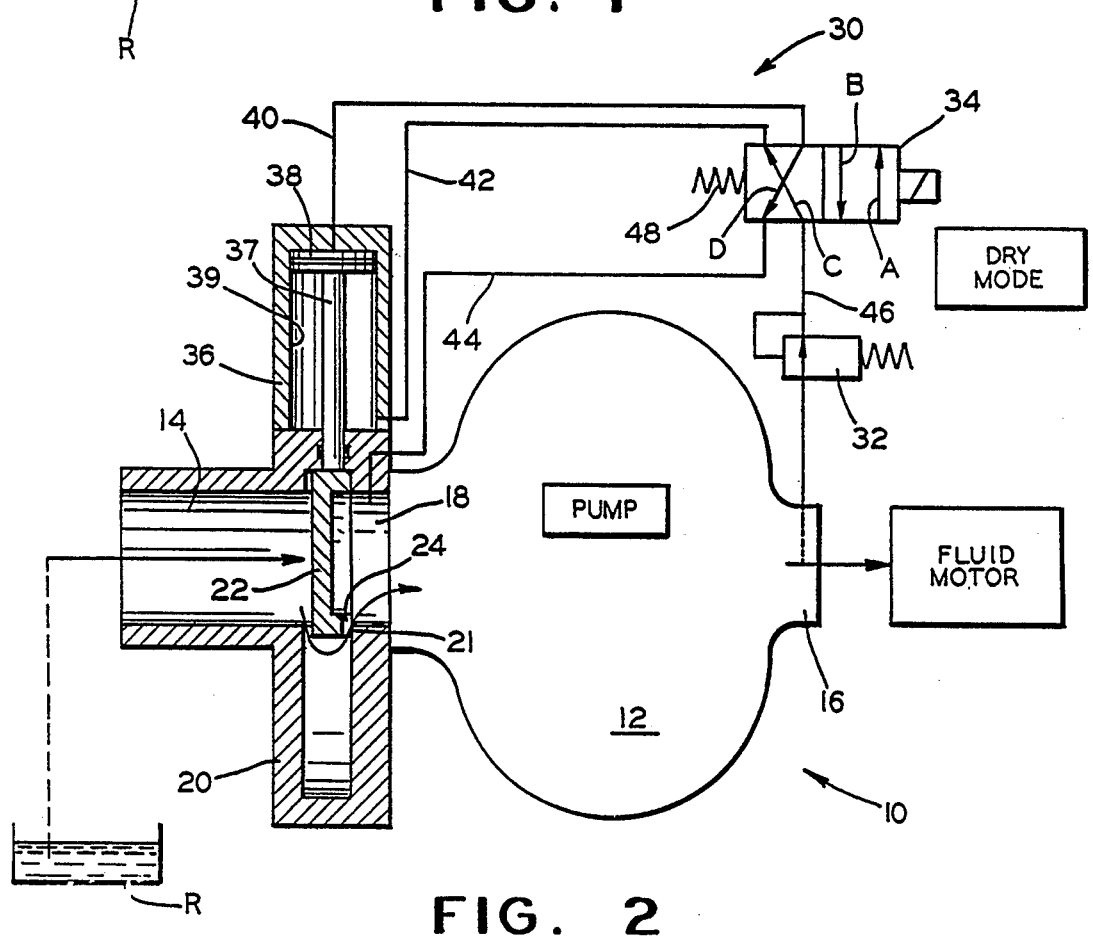
FIG. 2 is a view of the same control apparatus wherein the system is shown the dry pumping mode of operation.

Referring now more specifically to FIG. 2, the dry mode operation of the hydraulic pump system is also shown schematically. The four-way pilot valve 34 has been shifted into a second position wherein the pump outlet line 46 is now coupled directly to the actuator flow line 42 through the flow path C of the valve 34. As the actuator line 42 is coupled to the bottom of the cylinder 39, upon transition to the dry mode the piston 38 is forced upwardly against the top of the cylinder. Actuator flow line 40 then acts as a return line, and the return flow is through the flow path D of the valve 34 and into the inlet line 44. During the dry mode, a vacuum, or pressure below atmospheric, will exist at the inlet point 18 downstream of the closed gate valve 22. The latter vacuum will give rise to a pressure differential between the pump discharge 16 and the inlet point 18, to create a differential pressure range of 10 to 34 psi.

As will be appreciated by those skilled in the art, in the dry mode a notch 24 in the gate 22 and seat 21 of the assembly 20 will permit a small amount of hydraulic fluid to lubricate and cool the pump during the so called "non-operational" or dry condition of the continuously rotating pump. It will be apparent to those skilled in the art that the pressure differential will always be adequate to sustain the piston 38 in the position shown in FIG. 2 to hold the gate 22 in the closed position.

Finally, it will also be appreciated that an electric solenoid may be employed for actuation of the pilot valve 34. The solenoid can be operated against the load of a spring 48, which will preferably hold the valve in the dry mode operating (fail-safe) position upon loss of electric power (see FIG. 2).

Although only one preferred embodiment has been described herein, the following claims envision numerous others which will fall within their spirit and scope.

What is claimed is:

1. In a hydraulic pressure system adapted to generate a flow of pressurized fluid to a hydraulic motor from a fluid reservoir, said pressure system including a pump having an inlet port communicating with said reservoir, said pump having an outlet port communicating with said motor, wherein said system comprises fluid flow control apparatus communicating with both said inlet and outlet ports, said fluid control apparatus comprising moveable pilot valve having a first position which corresponds to an active pumping mode and a second position corresponding to a dry operating mode, a dry valve positioned at said inlet port for selective interruption of fluid flow to said inlet port from said reservoir, wherein said dry valve moves between a closed position wherein fluid flow through the pump is substantially prevented to define said dry operating mode, and an opened position wherein fluid flow is unrestricted to define said active pumping mode; an improvement comprising said control apparatus being responsive to pump output pressure for moving said dry valve to said closed position, and responsive to differential pressure between said inlet and outlet ports for moving said dry valve to said opened position, wherein pressure at said inlet port is taken at a point downstream of said dry valve, and wherein during said dry operating mode, pressure at said point is below atmospheric.

2. The hydraulic pressure system of claim 1 wherein said control apparatus comprises a reversible fluid control motor to move said valves between opened and closed positions, said fluid control motor directly coupled to the said dry valve.

3. The hydraulic pressure system of claim 2 wherein said fluid control motor of said control apparatus is a piston actuator which includes a cylinder, a piston reciprocally movable in said cylinder, said piston having a head and stem, wherein said stem is fixed directly to said dry valve.

4. The hydraulic pressure system of claim 3 wherein said dry valve comprises a gate valve.

5. The hydraulic pressure system of claim 5 wherein said gate valve comprises means for lubrication and cooling of said pump while said pump is operating in said dry mode.

6. The hydraulic pressure system of claim 5 wherein said means for lubrication and cooling comprises a notch in said gate valve.

7. The hydraulic pressure system of claim 6 wherein said control apparatus further comprises a pressure reducing valve situated at said pump outlet port.

8. The hydraulic pressure system of claim 7 wherein said pilot valve is actuated by an electric solenoid.

9. The hydraulic pressure system of claim 8 wherein said pilot valve is normally spring-loaded to said dry mode position.

* * * * *